United States Patent [19]

Raether

[11] 4,449,739
[45] May 22, 1984

[54] ROTARY COUPLING
[75] Inventor: Roger Raether, Ortonville, Minn.
[73] Assignee: Hi-Tec, Inc., Milbank, S. Dak.
[21] Appl. No.: 364,189
[22] Filed: Mar. 31, 1982

Related U.S. Application Data

[63] Continuation-in-part of Ser. No. 139,293, Apr. 11, 1980, abandoned.

[51] Int. Cl.³ .............................................. F16L 27/00
[52] U.S. Cl. ........................................ 285/14; 285/98; 285/281; 285/351
[58] Field of Search ............... 285/281, 280, 278, 275, 285/DIG. 11 (U.S. only), 98, 14

[56] References Cited

U.S. PATENT DOCUMENTS

| 1,075,693 | 10/1913 | Cassidy | 285/281 |
| 1,297,370 | 3/1919 | Loomis . | |
| 1,543,348 | 6/1925 | Venton . | |
| 1,695,019 | 12/1928 | McElroy | 285/281 X |
| 2,279,969 | 4/1942 | Casperson . | |
| 2,507,849 | 5/1950 | Bland | 285/281 |
| 2,695,794 | 11/1954 | Davis et al. | 285/275 X |
| 3,089,713 | 5/1963 | Scaramucci . | |
| 3,420,555 | 1/1969 | Faccou . | |
| 3,521,910 | 7/1970 | Callahan, Jr. et al. | 285/328 X |
| 3,967,842 | 7/1976 | Kendrick . | |
| 4,192,519 | 3/1980 | Buggele . | |
| 4,262,690 | 4/1981 | Binegar . | |
| 4,299,416 | 11/1981 | Grosch | 285/281 |

FOREIGN PATENT DOCUMENTS 762196 11/1956 United Kingdom .
1435498 5/1976 United Kingdom .

Primary Examiner—Thomas F. Callaghan
Attorney, Agent, or Firm—Merchant, Gould, Smith, Edell, Welter & Schmidt

[57] ABSTRACT

A rotary coupling for conducting high pressure liquid from a stationary source to a rotatable utilization device is disclosed. The coupling includes a hollow shaft, a mounting assembly having a cavity into which one end of the shaft extends and roller bearings for enabling rotation and preventing axial movement of the shaft, a packing surrounding the shaft in the cavity and resiliently compressed therearound, and a conduit for conducting high pressure fluid from the source to the cavity.

7 Claims, 4 Drawing Figures

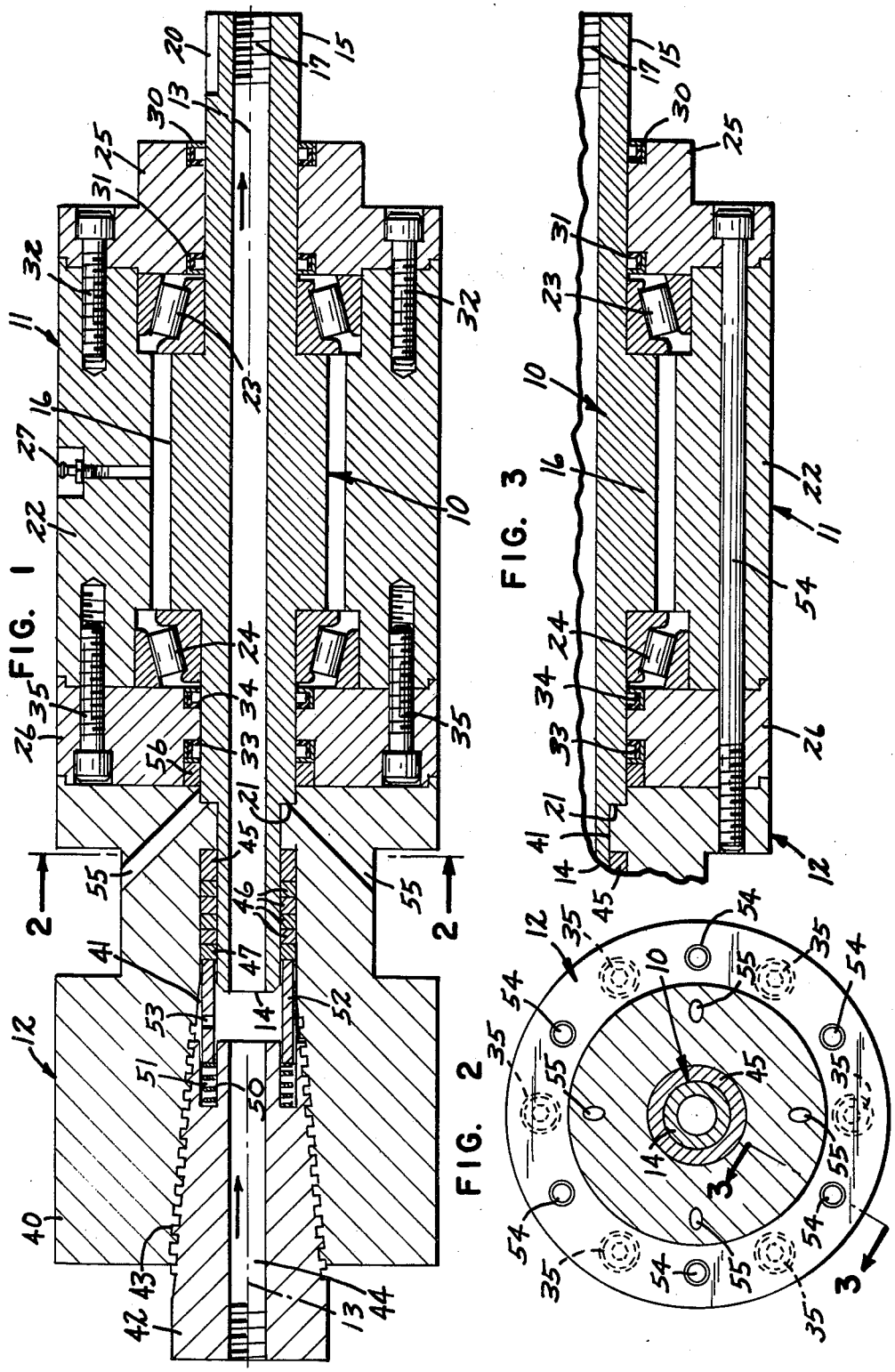

ROTARY COUPLING

This application is a continuation-in-part of application Ser. No. 139,293, filed Apr. 11, 1980, now abandoned continued in pending application Ser. No. 338,847, filed Jan. 12, 1982 now abandoned.

TECHNICAL FIELD

This invention relates to a rotary coupling for use on an apparatus utilizing a high pressure liquid. The coupler mates a stationary source to a rotatable, high pressure liquid utilization device.

BACKGROUND OF THE INVENTION

Swivel joints and rotary couplers for various types of apparatus are known. For example, swivel joints for connection of a pair of pipes wherein one pipe may swivel with respect to the other are shown in U.S. Pat. Nos. 1,297,370, 2,279,969 and 3,089,713 and British Pat. Nos. 762,196 and 1,435,498. Each of these patents shows the use of at least one bearing in order to allow one of the pipes to rotate with respect to the other. These patents also show some type of sealing mechanism. U.S. Pat. No. 2,279,969 utilizes a face seal, while the other patents show some type of packing mechanism or seal which expands as it is subjected to the pressure of the liquid. These patents, however, are directed to low pressure (likely below 2,000 PSI) and low speed swiveling applications. U.S. Pat. Nos. 1,297,370 and 3,089,713 use either a single ring of ball bearings or a pair of cooperating rings of ball bearings. The other three patents show pairs of bearings located nearly adjacent each other. The British patents show a spacing element separate from both the shaft and the housing. None of these devices contemplate high speed shaft or pipe rotation, nor the elimination of shaft or pipe vibration during such rotation. Furthermore, since the swivel joints are designed for low pressure applications, the bearing design is not critical to the reliability of the seal.

Various sealing and packing combinations are also known. U.S. Pat. No. 4,192,519 shows a plurality of rings used in sealing the access opening in a pressure vessel. Somewhat similarly, U.S. Pat. No. 4,262,690 shows a plurality of packing rings for sealing the stem on gate valves. Although the stem is not static as in the previous example, a valve stem rotates relatively slowly.

Additionally, in recent years there have been various attempts at designing rotary coupling mechanisms for transmitting high pressure liquid (e.g. 15,000 PSI or greater). In general, these attempts have failed because the high pressure and high rotation environment has caused seal failure within a few seconds. These attempts serve to distinguish the physical environment of low pressure and low swiveling rotation as in the patents discussed hereinbefore from an environment of high pressure and high speed rotation. High speed rotation implies radial and axial loading forces not present in static and swiveling situations which must be isolated from or absorbed by the high pressure sealing mechanism. Thus, although the prior art has addressed low pressure, low speed situations, its relevance must be questioned in view of the different challenge presented by the high pressure, high speed situation. The present invention is directed to solving this challenge.

SUMMARY OF THE INVENTION

The present invention is directed to a rotary coupler for conducting high pressure liquid from a stationary source to a rotatable utilization device. The coupler is comprised of a hollow rotatable shaft for supporting the utilization device and a housing mechanism for mounting the shaft to the stationary source. The housing mechanism includes a high pressure end mounting assembly having a walled cavity coaxial with the shaft into which the first end of the shaft extends. The walled cavity has an input opening through which the high pressure liquid flows before passing to the shaft and utilization device. The housing mechanism holds a pair of roller bearings in spaced relation so as to support the shaft. A plurality of sealing rings are located about one end of the shaft to extend between the shaft and the wall of the assembly cavity in the housing mechanism.

More particularly, the bearings advantageously include cylindrical rollers which are oriented angularly with respect to the axis of the shaft. The bearings are widely spaced to alleviate shaft movement and vibration due to the radial and axial loading which may otherwise be caused by the utilization device, the drive mechanism for the shaft, and the high velocity of the high pressure fluid. Furthermore, the bearings are preloaded. It has been found that shaft loading is critical to seal reliability and life. Bearing preloading unloads or further absorbs loading in a direction opposite to the shaft vibratory loading. When the bearings are not supported in this fashion, bearing performance not only degrades seal performance, but also results in bearing failure.

The present coupling device preferably includes a plurality of sealing rings wherein there are outer rings and inner rings therebetween. At least one of the inner rings is designed to yield under the high pressure so as to flow and fill the space between the high speed shaft and the wall of the cavity. The outer rings retain the inner rings and prevent extrusion.

Although the spacing of the bearings and the orientation of the rollers in the bearings alleviate to a considerable extent any shaft vibration and movement, seal integrity is even further enhanced in the present invention by requiring nearly perfect relative concentricity on the regions of the shaft wherein the bearings and sealing rings are located. Furthermore, the region of the shaft on which the sealing rings make contact is nearly perfectly smooth and extremely hard. Such requirements are highly technical but quite important to seal wear and reliability.

Thus, the present rotary coupler has been acclaimed by many who are skilled in the art as the breakthrough needed before there could be proper utilization of high pressure liquid to perform a variety of cutting and surface scarifying tasks. The present coupler allows high speed shaft rotation with very minimal shaft flexure or vibration. The shaft steadiness in combination with the attention to such detail as concentricity, smoothness and hardness allows use of efficient sealing mechanisms in an environment where such use was otherwise thought impossible. The breakthrough represented by this coupler may well result in applications such as road repair taking hours instead of months and fracture free cutting of cavities in rock formations otherwise thought to be impossible for the use for example for storing toxic and nuclear waste materials.

These advantages and other objects obtained by the use of this present invention may be better understood by reference to the drawings which form a further part of this disclosure and to the accompanying descriptive matter in which there is illustrated and described in more detail a preferred embodiment of this invention.

BRIEF DESCRIPTION OF THE DRAWING

In the drawing, FIG. 1 is a view of a rotary coupler according to the invention in axial section, FIG. 2 is a transverse sectional view taken along the line 2—2 of FIG. 1, FIG. 3 is a fragmentary sectional view taken generally along the line 3—3 of FIG. 2.

DETAILED DESCRIPTION OF THE INVENTION

Figure 4:
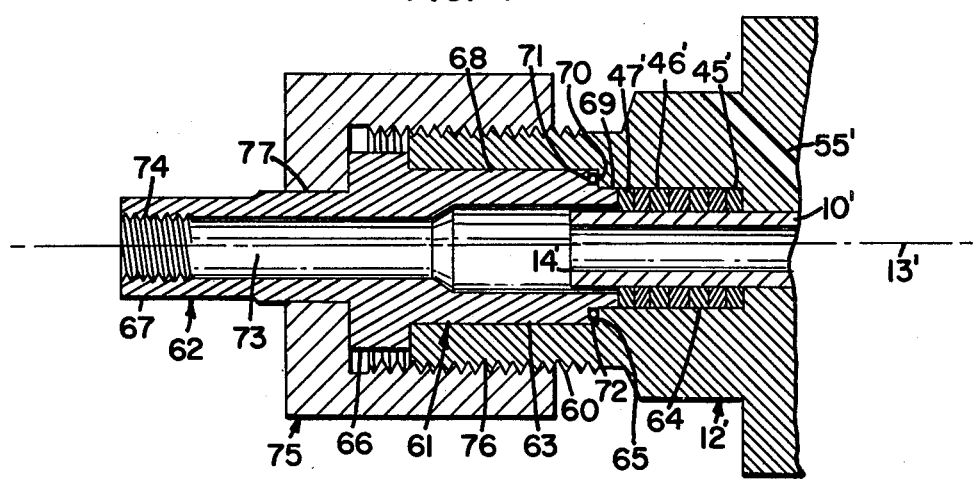
FIG. 4 is a sectional view of an alternate embodiment of mechanism for securing a connecting line to the housing of the present invention.

The invention is seen to comprise a hollow rotatable shaft 10, a bearing assembly 11, and a mounting assembly 12. Assemblies 11 and 12 combine to form the housing for the coupling. Shaft 10 is shown in FIG. 1 to extend along an axis 13 between a first end 14 and a second end 15, and has a central enlarged portion 16. End 15 is connected to a utilization device such as a "water lance" by mechanisms such as an internal thread 17 and external keyway 20. End 14 has a step 21.

Bearing assembly 11 includes an element 22 for holding radially a pair of roller bearings 23, 24. Outboard end cap 25 and inboard cap 26 retain bearings 23, 24 in an axial direction. The races of bearings 23, 24 are compressed by end caps 25, 26 against enlarged portion 16 of shaft 10. It has been found preferable to allow the races of bearings 23, 24 to extend beyond the ends of element 22 as much as 0.004 inch (0.10 mm). This preloading of bearings 23, 24 is sufficient to prevent the turning of shaft 10 by hand and allows turning only with the help of a wrench 10 to 12 inches in length. As the shaft is rotated, bearings 23, 24 seat to thereafter allow somewhat easier shaft rotation. The preloading of bearings 23, 24 insures a secure support for shaft 10 so that regardless of radial or axial loading by a drive mechanism (not shown) or the utilization device (not shown) the shaft rotates with a minimum of vibration. Bearings 23, 24 are separated sufficiently far by enlarged portion 16 on shaft 10 to further insure almost perfectly true rotation of shaft 10 about axis 13 regardless of the axial and radial loading by the drive mechanism and the utilization device. Bearings 23, 24 are preferably of the type wherein cylindrical rollers are inclined with respect to axis 13. This bearing type aids in alleviating vibration or other shaft movement in spite of radical and axial shaft loading.

End cap 25 is provided with seals 30 and 31 to prevent water, grit and other foreign materials from moving along shaft 10 to bearing 23. End cap 25 is secured to element 22 by fasteners such as 32. End cap 26 has seals 33 and 34 to prevent similar movement of contaminating materials along shaft 10 toward bearing 24. End cap 26 is secured to element 22 by fasteners such as screws 35. Element 22 is provided with a grease fitting 25.

Mounting assembly 12 comprises a mounting member 40 having a cavity 41, coaxial with shaft 10, into which the end 14 of shaft 10 projects. A connecting plug 42 is taper threaded into member 40 at 43, and has a threaded bore 44 for communication with a source of high pressure fluid to conduct the fluid to cavity 41. Any connection between connecting plug 42 and mounting assembly 12 is simply a joint between high pressure elements and is not complicated by a rotational member such as shaft 10 at the other end of the present coupler.

Assembly 11 is secured to assembly 12 by a plurality of fasteners 54 which traverse cap 25, housing 22 and cap 26, respectively, before being threaded into member 40. A plurality of apertures 55 in member 40 at the site of shoulder 21 on shaft 10 provides egress for any fluid leaking along the outside of shaft 10 passed the packing mechanism to be described hereinafter.

The sealing mechanism at end 14 of shaft 10 in cavity 41 is a very important aspect of the present coupler. A number of different configurations have been tried. It has been found that all movement, other than rotation, of end 14 must be radically minimized. The preloading and spacing of bearings 23, 24 and the angular orientation with respect to axis 13 of the rollers in bearings 23, 24 were discussed hereinbefore with regard to the firm support of shaft 10. Additionally, it has been found that the concentricity of the regions on shaft 10 which contact bearings 23, 24 and the packing mechanism should have nearly perfect relative concentricity, for example, 0.0001 inch (0.0025 mm). It has been found, too, that the surface near end 14 of shaft 10 where the packing mechanism is in contact with shaft 10 should be very hard, for example, Rockwell hardness of 40 to 43. Sufficient hardness prevents shaft wear thereby increasing seal lifetime and reliability. Adequate hardness is obtainable by plating end 14 with 0.001 inch (0.025 mm) titanium nitride. Also, end 14 should have as fine a finish as possible. Preferably, the titanium nitride plating is ground and lapped to a 3 to 5 microfinish. The combination of a hard and nearly perfectly smooth finish and a nearly perfect relative concentricity in the indicated regions combines to reduce the likelihood of seal failure and, consequently, increases substantially seal lifetime and reliability.

Sealing around end 14 of shaft 10 in cavity 41 may be accomplished by an inner brass seal 45, a plurality of graphite seals 46, and an outer brass seal 47. The seal mechanism may also be accomplished wherein rings 46 are replaced by alternate rings of graphite and a synthetic resin, like nylon. There may be three graphite rings and two nylon rings, or vice versa. Also, the combination of three nylon rings and two delron rings has worked well. Preferably, however, the seal is accomplished with three nylon rings and two graphite rings wherein a graphite ring is between two nylon rings. As the liquid pressure increases beyong the yield strength of the nylon, for example 15,000 to 20,000 PSI, the nylon tends to flow and efficiently fill the space between rings on either side of it. The brass rings are especially capable of retaining the fluid nylon and preventing it from extruding and consequently deforming. To maintain seal integrity before liquid pressure reaches the yield point of nylon, it has been found advantageous to provide an interference fit at both the inside and outside diameters for the nylon seals such that the nylon rings are slightly compressed between shaft 10 and the wall of cavity 41. If there is, however, fluid leakage passed the seal mechanism along shaft 10, the fluid travels to step 21. Step 21 causes any leaking fluid to change direction and be directed toward the plurality of apertures 55 in member 40. As a further precaution, brass seal 56 and seals 33 and 34 insure that there is no leakage which continues along the greater diameter of shaft 10 to bearing 24.

An optional seal retaining spring 50 may be contained in a recess 51 in the end of connecting plug 42. Spring 50 provides an axial force on a hollow cylindrical retainer 52 to hold rings 45, 46 and 47 from moving axially. Retainer 52 is provided with one or more cross bores 53 to equalize the pressure within and without it. Retainer 52 does not fit tightly in cavity 41 or around shaft end 14. It is to be understood that spring 50 may be a helical compression spring, a leaf spring or other type of force mechanism which holds seal ring 47 in place.

FIG. 4 shows an alternate embodiment for a connection of a high pressure line (not shown) to a mounting assembly 12'. Mounting assembly 12' is very similar to the previous embodiment designated by the numeral 12 in FIG. 1 except that the end portion 60 has been decreased in diameter and provided with threads, and the internal taper thread 43 has been replaced with a cylindrical cavity 61 for receiving swivel plug 62. Cavity 61 has a larger diameter region 63 and a smaller diameter region 64 with a shoulder 65 therebetween.

Swivel plug 62, has an enlarged portion 66 separating outer end portion 67 from inner end portion 68. A pilot extension 69 has a smaller diameter than inner end portion 68 and mates relatively tightly with cavity 64 to center swivel plug 62 on axis 13'. In face 70 between extension 69 and end portion 68, groove 71 holds compression ring 72. Swivel plug 62 has a centered bore 73 with threads 74 at the outer end for mating with a connecting line (not shown) and an enlarged diameter at the inner end for loosely receiving end 14' of shaft 10'.

Swivel cap 75 is cup shaped with inner threads 76 and a central opening 77 for receiving end portion 67 of swivel plug 62. Swivel cap 74 is tightened onto mounting assembly 12' thereby locating swivel plug 62 relative to mounting assembly 12'. Extension 69 faces up to seal 47' thereby holding seals 45', 46' and 47' in place. Ring 72 compresses to seal the smaller diameter portion 64 from the larger diameter portion 63 of cavity 61. In this fashion, swivel plug 62 and swivel cap 74 function to attach a connecting line (not shown) to the present coupler mechanism.

OPERATION

In use the coupler is connected to a source of fluid under high pressure at threaded bore 44, and a utilization device is connected to the coupler at 17, 20. Lubricant is supplied to bearings 23, 24 through fitting 27. Leakage of lubricant from the assembly 11 is prevented by seals 31 and 34. When fluid under high pressure is supplied by the source, it flows through bore 44, cavity 41, and the bore of shaft 10 to the utilization device. The pressures inside and outside of retainer 52 are equal, so there is no tendency to hydraulically relieve the pressure of spring 30 in maintaining the seals about shaft end 14. The loose fit of retainer 52 enables pressurized fluid from cavity 41 to contact seal 47 and hydraulically increase the sealing effect. As fluid pressure increases to a level greater than the yield point of nylon or one of the other seal ring substances, the nylon flows to enhance the sealing effect between shaft 10 and cavity 41. Any fluid which leaks passed seals 45, 46 and 47 is ejected through apertures 55, and is prevented from entering housing 22 by seals 33 and 56. Entrance of air or dirt into the housing under working conditions is prevented by seals 30, 56 and 33.

As indicated hereinbefore, a drive mechanism rotates shaft 10 and the utilization device. Consequently, shaft 10 is subjected to considerable axial and radial loads. Roller bearings 23, 24 with the angled orientation of the rollers with respect to axis 13 and the spaced relationship as well as the preloaded condition and the highly concentric relationship with respect to the sealing mechanism hold end 14 of shaft 10 extremely steady as it rotates in order to maintain the effectiveness of the sealing mechanism comprising rings 45, 46 and 47.

Although these numerous characteristics and advantages of the invention which have been set forth in the foregoing description, together with the details of structure and function of the invention, it is to be understood that the disclosure is illustrative only. Consequently, any changes made in detail, especially in matters of shape, size, and arrangement of parts, are within the principle of the invention to the full extent indicated by the broad general meaning of the terms in which the appended claims are expressed.

What is claimed is:

1. A rotary coupler for conducting high pressure fluid from a stationary source to a rotatable utilization device, said coupler comprising:

a hollow rotatable shaft having a first upstream end in fluid communication with said source and a second downstream end in fluid communication with said utilization device, said shaft having an enlarged portion with a first axial length;

first and second roller bearings on opposite sides of said enlarged portion from one another, said first and second bearings having first and second widths;

first means for housing said first and second bearings, said first housing means including a cylindrical wall and a pair of end caps, said cylindrical wall fitting closely in a radial dimension about said first and second bearings, said cylindrical wall having a second axial length shorter than a total distance of the first axial length of said enlarged portion and the first and second widths of said first and second bearings, each of said first and second bearings extending before compression a short distance axially beyond said cylindrical wall, said first housing means including means for fastening said end caps to said cylindrical wall to axially compress said bearings against said enlarged portion of said shaft when said end caps are fastened to said cylindrical wall, said first housing means including low pressure packing means for sealing said bearings from low pressure fluids and debris;

second means for housing the first upstream end of said shaft, said second housing means being attached to said first housing means, said stationary source being in fluid communication with said second housing means allowing said fluid to flow from said stationary source to said rotatable utilization device through said second housing means and said hollow shaft;

high pressure packing means, within said second housing means, for sealing between the first end of said shaft and said second housing means;

whereby said first housing means provides steady support for said shaft allowing said high pressure packing means to seal between said shaft and said second housing means with respect to said high pressure fluid.

2. A rotary coupler in accordance with claim 1 wherein said shaft includes first regions of nearly perfect relative concentricity, said bearings and said packing means being located on said shaft first regions whereby said first regions aid in reducing vibration of said shaft thereby reducing wear and failure of said packing means.

3. A rotary coupler in accordance with claims 2 wherein said shaft includes a second region having Rockwell hardness of 40 to 43, said packing means being located on said shaft second region whereby said hardness reduces wear due to said packing means thereby maintaining seal effectiveness.

4. A rotary coupler in accordance with claim 3 wherein said second region is ground and lapped to a finish of 3 to 5 microfinish.

5. A coupler in accordance with claim 1 wherein said high pressure packing means includes means for flowing when subjected to pressure greater than a predetermined level.

6. A coupler in accordance with claim 5 wherein said flowing means includes sealing rings comprising a nylon material.

7. A coupler in accordance with claim 1 including an aperture leading from a portion of the wall of said second housing means to the first end of said shaft for enabling escape of any fluid leaking along said shaft passed said high pressure packing means.

* * * * *

UNITED STATES PATENT AND TRADEMARK OFFICE
CERTIFICATE OF CORRECTION

PATENT NO. : 4,449,739
DATED : May 22, 1984
INVENTOR(S) : Roger Raether

It is certified that error appears in the above-identified patent and that said Letters Patent is hereby corrected as shown below:

Column 2, line 27, delete "shaft" and insert therefor --bearing--.

Column 3, line 54, delete "radical" and insert --radial--.

Column 4, line 52, delete "beyong" and insert --beyond--.

Column 5, line 64, delete "passed" and insert therefor --past--.

Column 7, line 10, delete "claims" and insert --claim--.

Column 8, line 15, delete "passed" and insert --past--.

Signed and Sealed this

Twenty-ninth Day of January 1985

[SEAL]

Attest:

DONALD J. QUIGG

Attesting Officer

Acting Commissioner of Patents and Trademarks